United States Patent
Mack et al.

(10) Patent No.: US 7,325,601 B2
(45) Date of Patent: Feb. 5, 2008

(54) SHAFT LOCKING COUPLINGS FOR SUBMERSIBLE PUMP ASSEMBLIES

(75) Inventors: John J. Mack, Tulsa, OK (US); Earl B. Brookbank, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 266 days.

(21) Appl. No.: 11/114,877

(22) Filed: Apr. 25, 2005

(65) Prior Publication Data

US 2005/0199384 A1  Sep. 15, 2005

Related U.S. Application Data

(63) Continuation-in-part of application No. 10/160,899, filed on Jun. 3, 2002, now Pat. No. 6,883,604.

(60) Provisional application No. 60/296,014, filed on Jun. 5, 2001.

(51) Int. Cl.
F04B 53/22 (2006.01)

(52) U.S. Cl. .................. 166/105; 403/305

(58) Field of Classification Search ............ 166/377, 166/107, 105; 403/300, 305, 359.5
See application file for complete search history.

(56) References Cited

U.S. PATENT DOCUMENTS

| | | | | |
|---|---|---|---|---|
| 317,154 A | * | 5/1885 | Lowrie | 403/182 |
| 1,469,304 A | * | 10/1923 | Hughes | 403/305 |
| 2,161,501 A | * | 6/1939 | Blackmon | 423/328 |
| 2,327,951 A | * | 8/1943 | Zaleske | 403/289 |
| 2,829,503 A | * | 4/1958 | Hayes | 173/128 |
| 2,832,943 A | * | 4/1958 | Cutler | 439/357 |
| 3,273,508 A | * | 9/1966 | Lung | 415/199.1 |
| 4,865,485 A | | 9/1989 | Finnefrock, Sr. | |
| 4,892,161 A | | 1/1990 | Ebeling | |
| 4,906,123 A | | 3/1990 | Weskamp et al. | |
| 5,501,542 A | * | 3/1996 | Hall, Sr. | 403/306 |
| 5,658,087 A | | 8/1997 | Butkovich et al. | |
| 5,688,067 A | | 11/1997 | Straub | |
| 6,009,609 A | * | 1/2000 | Hanno | 29/401.1 |
| 6,129,529 A | * | 10/2000 | Young et al. | 417/423.3 |
| 6,361,280 B1 | | 3/2002 | Furnas | |
| 6,364,013 B1 | | 4/2002 | Watson et al. | |
| 6,561,775 B1 | * | 5/2003 | Wefers | 417/423.3 |
| 6,868,912 B2 | | 3/2005 | Proctor | |
| 2002/0179305 A1 | | 12/2002 | Mack | |

FOREIGN PATENT DOCUMENTS

WO  2005/024176 A1  3/2005

* cited by examiner

*Primary Examiner*—David Bagnell
*Assistant Examiner*—Daniel P Stephenson
(74) *Attorney, Agent, or Firm*—Bracewell & Giuliani LLP

(57) ABSTRACT

An electrical submersible pump assembly has first and second modular component sections, each of the sections having an outer housing and an inner shaft member. A coupling sleeve having a bore is disposed between the modular component sections and receives the shaft member of each of the component sections. The bore of the coupling sleeve and the shaft members have mating drive shoulders for transmitting torque. An axial tension transmitting shoulder is affixed to the shaft member of the first modular component section and located in the bore of the coupling sleeve. A latch member carried by the shaft member of the second modular component section engages the axial tension transmitting shoulder as the modular components are moved together to secure the shaft members to one another for transferring axial tension from one of the shaft members to the other. A retainer prevents disengagement of the latch member.

18 Claims, 3 Drawing Sheets

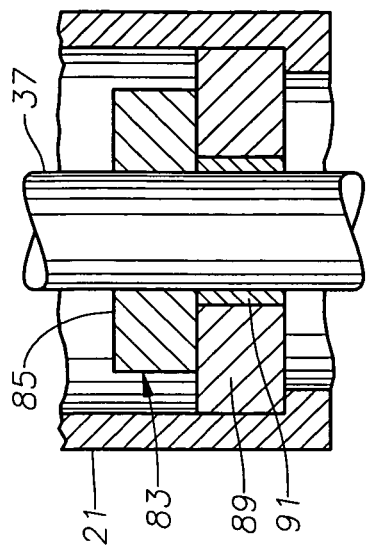
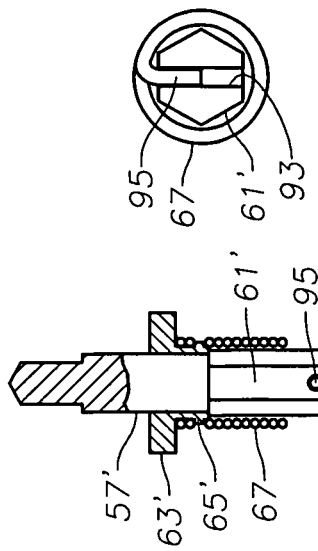
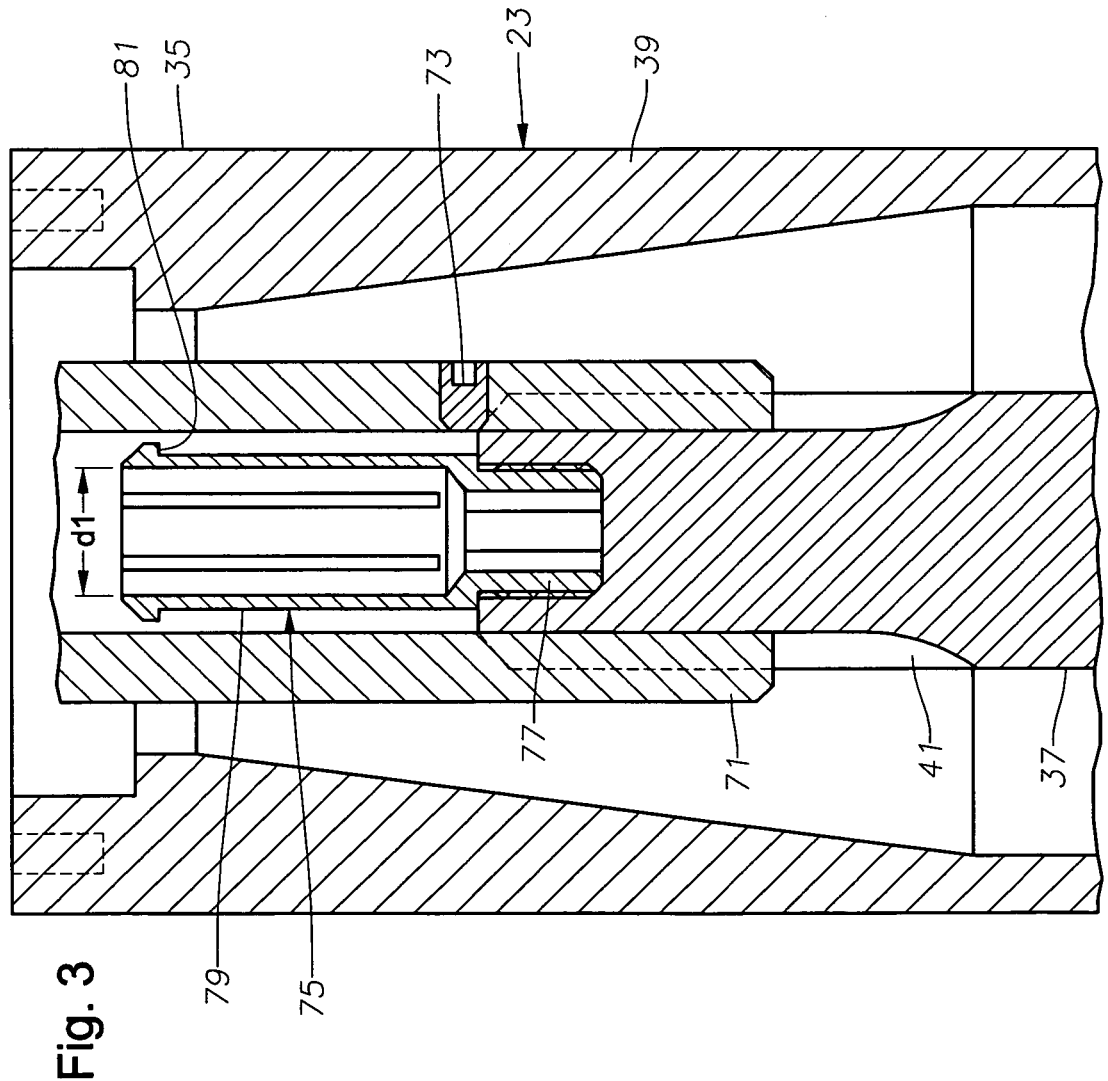

SHAFT LOCKING COUPLINGS FOR SUBMERSIBLE PUMP ASSEMBLIES

CROSS-REFERENCE TO RELATED APPLICATION

This application is a continuation-in-part of Ser. No. 10/160,899, filed Jun. 3, 2002, now U.S. Pat. No. 6,883,604, issuing Apr. 26, 2005, which claims the provisional filing date of Jun. 5, 2001, Ser. No. 60/296,014.

FIELD OF THE INVENTION

The invention relates to devices and techniques for coupling shafts and other portions of submersible pump assemblies and like components.

BACKGROUND OF THE INVENTION

Conventionally, electrical submersible pump ("ESP") assemblies have been made up of a series of interconnectable modular sections including one or more pump sections with an associated fluid intake, a motor section and a seal section. Each of these sections includes an outer housing and a central drive shaft. At present, the shafts and their connections are designed so that they can primarily transmit a compression load. The shaft of each section is interconnected with the shaft of the adjacent section by straight splines for transmitting torque only. There are normally no securing members used that would resist pulling apart of the shafts. Placement of the shafts or shaft connections under tension loads will cause the connection to separate easily.

This sort of "compression only" connection between shaft members is permissible when a standard ESP configuration is used wherein the pump section(s) are located above the seal and motor sections. In pump assemblies with pumps mounted above the motor, down thrust on the shafts typically passes downward to a thrust bearing located in the seal section between the pump or pumps and the motor. The motor also normally has a thrust bearing. The thrust bearings in the seal and motor sections support the pump sections, and the shaft members in the pump sections are not placed in tension.

When a "bottom intake" ESP configuration is used, however, the pump section(s) are located below the motor and seal section in the wellbore. An expensive thrust bearing is normally mounted to the lower end of the pump section(s) to support the ESP components. Downward force on the shaft sections in the pump(s) passes to the thrust bearing at the lower end of the pump(s).

Although it might be possible to simply pin or weld the shafts of adjacent ESP sections together to transmit tension, there is an operational problem with doing so. In practice, it is difficult to assemble and disassemble the pinned shafts since they reside within the housings. If the connection is welded, it is quite difficult to disassemble the sections after removal of the pump assembly from the wellbore.

SUMMARY OF THE INVENTION

The invention provides methods and devices for interconnection of components within an electrical submersible pump assembly and the like. This interconnection is preferably between a motor assembly and a pump section. The shaft sections are interconnected to support compression loading as well as a predetermined amount of tension loading.

A coupling sleeve has a bore and is disposed between the modular component sections for receiving therein the shaft member of an adjacent component sections. The bore of the coupling sleeve and exterior portions of the shaft members have mating torque transmitting shoulders. An axial tension transmitting shoulder is carried by the shaft member of one of the modular component sections. A latch member, carried by the shaft member of an adjacent modular section, moves into engagement with the axial tension transmitting shoulder as the modular sections are moved toward each other. The engagement of the latch member with the axial tension transmitting shoulder secures the shaft members to one another for transferring axial tension from one of the shaft members to the other.

A retainer is carried by one of the shaft members and located adjacent the latch member. The retainer has a locked position that prevents the latch member from disengaging from the axial tension transmitting shoulder once engaged.

When a pump assembly is used in a bottom intake configuration, the thrust bearing in the motor assembly above the pump sections handles down thrust imposed on the shafts. Preferably, the thrust bearing is located in the seal section between the motor and the pump or pumps. The down thrust on the shafts transfers through the latch member between the seal section and the pump or pumps.

BRIEF DESCRIPTION OF THE DRAWINGS

FIG. 3 is an enlarged sectional view of an upper portion of the upper pump of the pump assembly of FIG. 1, showing a lower portion of a latch member.

FIG. 6 is a schematic view of a thrust bearing located in the seal section of the pump assembly of FIG. 1.

FIG. 7 is a partial sectional view of an alternate embodiment of a retaining member for the latch member of FIGS. 2-5.

FIG. 8 is an end view of the retaining member of FIG. 7.

DETAILED DESCRIPTION OF THE PREFERRED EMBODIMENTS

Figure 1:
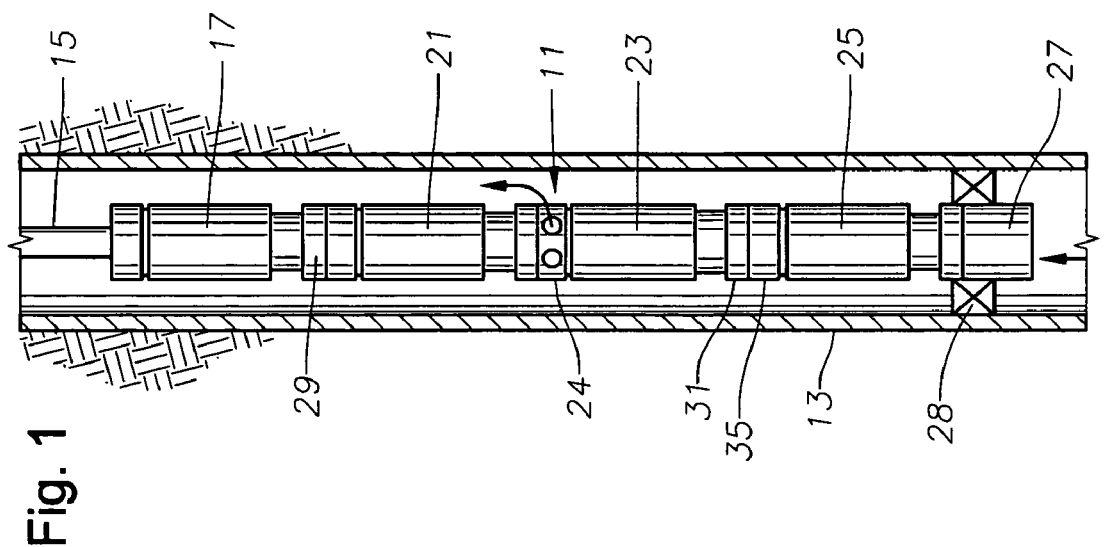
FIG. 1 is a schematic elevational view of a pump assembly constructed in accordance with this invention.

FIG. 1 illustrates a pump assembly 11 located within a well having casing 13. Pump assembly 11 is connected to a supporting string 15, which may comprise continuous coiled tubing, sections of production tubing secured together, or a cable. In this embodiment, motor 17 is located at the upper end of pump assembly 11, rather than at the more conventional lower end. Motor 17 is an AC three-phase motor that is supplied with power from the surface via a power cable that either extends through or alongside supporting string 15.

A seal section 21 connects to the lower end of motor 17. Seal section 21 is a conventional component that reduces pressure differential between the hydrostatic pressure in casing 13 and the interior pressure of lubricant contained within motor 17. The dielectric lubricant in motor 17 is in fluid communication with dielectric lubricant in seal section 21. Although normally separate components, seal section 21 and motor 17 could be permanently joined and are considered herein to be a part of a motor assembly.

At least one pump section secures to the lower end of seal section 21. In this embodiment, two pump sections 23, 25 are shown connected in tandem, but only one pump could be used. Upper pump section 23 has a discharge 24 at its upper end for discharging well fluid into the interior of casing 13. Discharge 24 could alternately be in a lower part of seal section 21. An intake manifold 27 is located at the lower end of lower pump section 25. Intake manifold 27 extends into a packer 28 that seals the lower end of lower pump section 25 to casing 13. Well fluid from perforations (not shown) in casing 13 below packer 28 flows into intake manifold 27 and is discharged out discharge 24.

Figure 2:
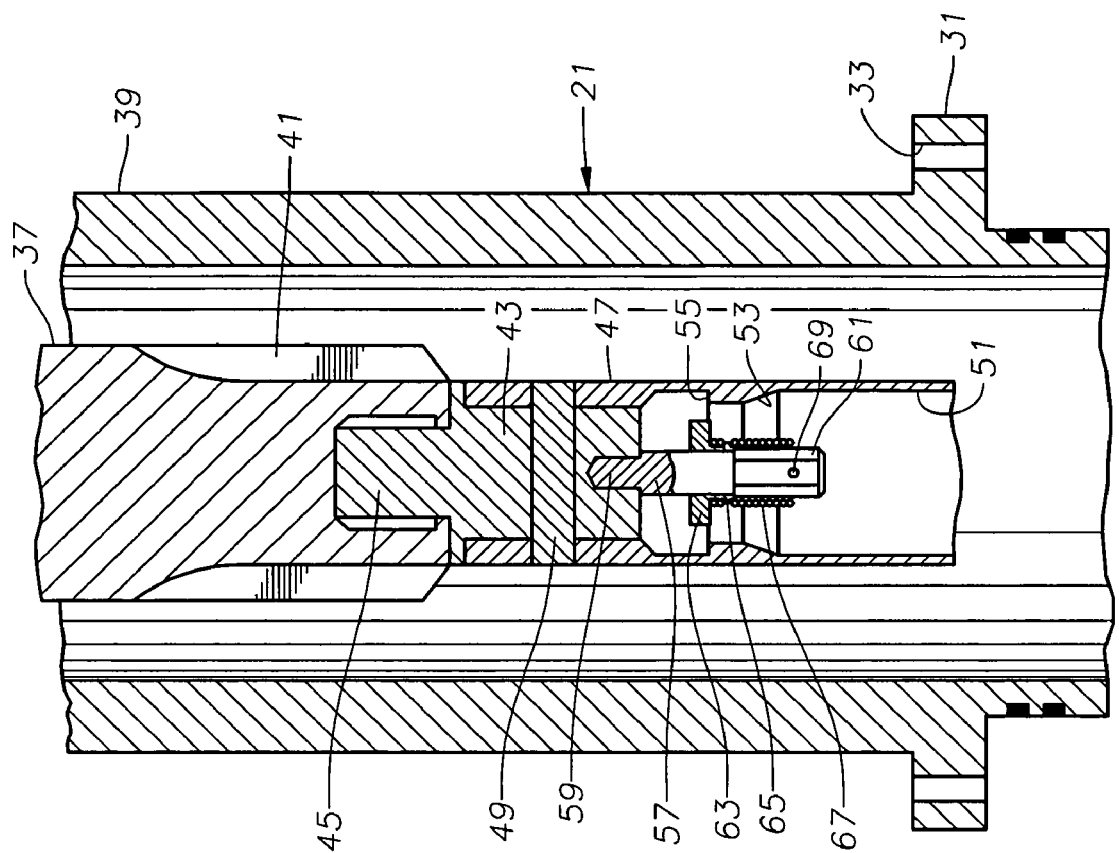
FIG. 2 is an enlarged sectional view of a lower portion of the seal section of the pump assembly of FIG. 1, showing an upper portion of a latch member.

Motor 17 is connected to seal section 21 by a conventional connector 29, which typically employs bolts that extend through flanges. The connector between seal section 21 and upper pump 23 and the connector between upper pump 23 and lower pump 25 are preferably constructed the same. FIGS. 2 and 3 illustrate the connector between seal section 21 and upper pump 23. Like connector 29 (FIG. 1), this connector has an upper flange 31 containing bolt holes 33 (FIG. 2) for receiving bolts. The bolts screw into a connector base 35, shown in FIG. 1 and FIG. 3.

Motor 17, seal section 21, and pumps 23 and 25 each has a segment of a drive shaft 37, shown in FIG. 2. Drive shaft 37 is rotated by motor 17 (FIG. 1) and is concentric within a cylindrical housing 39. Each segment of drive shaft 37 has axially extending splines 41 on its ends to provide radial shoulders for transmitting torque.

A stud 43 has a threaded end 45 that secures into a mating threaded receptacle in the lower end of drive shaft 37 in seal section 21. A socket 47 slides over the protruding portion of stud 43. Socket 47 is secured to stud 43 by a shear pin 49 that extends through a hole transversely formed through them. Socket 47 has a socket interior 51 that is cylindrical. An annular ramp 53 is located within socket interior 51. Ramp 53 converges inward in an upward direction to a minimum diameter at an axial tension transmitting shoulder 55. The minimum inner diameter of ramp 53 is smaller than the inner diameter of the portions of socket interior 51 located below it. The outer diameter of shoulder 55 is preferably the same as the inner diameter of the portions of socket interior 51 below ramp 53.

A rod 57 has a threaded end 59 secured to a threaded receptacle in the lower end of stud 43. Rod 57 extends downward on the longitudinal axis of shaft 37. Rod 57 has a lower polygonal end 61 in this embodiment to enable rod 57 to be engaged by a wrench to secure its threaded end 59 to stud 43. Polygonal end 61 is optional and could be replaced with other means for rotating threaded rod 57 into threaded engagement with stud 43.

A retainer 63 is carried by rod 57. In this embodiment, retainer 63 is an annular disk with a neck 65 on its lower end. Rod 57 extends through a hole in retainer 63. A coil spring 67 encircles and secures to neck 65, which has a radially extending shoulder in the embodiment of FIGS. 2-5. Coil spring 67 has a tang on its lower end that inserts into a retention hole 69 drilled transversely through polygonal end 61. Coil spring 67 is in a natural, unsearched position in FIG. 2, with retainer 63 in a first position. In this first position, retainer 63 is located approximately in alignment with axial tension transmitting shoulder 55. When retainer 63 is in the second position of FIG. 4, coil spring 67 is stretched.

Referring to FIG. 3, a coupling sleeve 71 is shown located on the upper end of the shaft portion 37 that is in upper pump section 23. Coupling sleeve 71 has internal splines that engage splines 41 on the shaft portion 37 located within upper pump section 23. The splines of coupling sleeve 71 also engage splines 41 (FIG. 2) on the lower end of shaft 37 in seal section 21. A lower retainer screw 73 extends through the side wall of coupling sleeve 71 into engagement with an upper end of shaft 37 in upper pump 23 to stop downward movement of coupling sleeve 71 on splines 41. There is a similar upper retainer screw 73 (FIG. 4) for engaging the lower end of the shaft 37 in seal section 21.

A latch member 75 has a threaded end 77 that engages a threaded receptacle formed in the upper end of shaft 37 in upper pump 23. Latch member 75 has a plurality of fingers 79 arranged in a cylindrical array. The upper ends of fingers 79 are free and resilient so that they can deflect radially inward and outward. A catch or exterior ledge 81 is located on the upper end of each finger 79.

Figure 4:
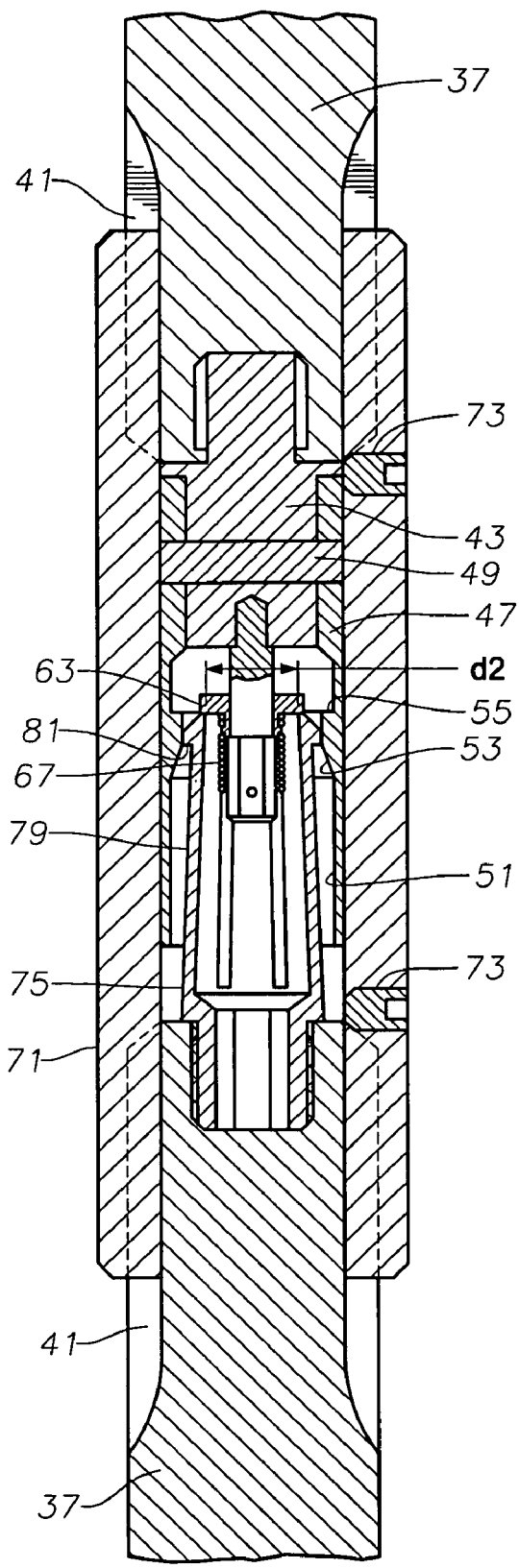
FIG. 4 is a sectional view of the upper and lower portions of the latch member of FIGS. 2 and 3, shown moving into engagement with each other, with the housings of the seal section and the upper pump not being shown.

To connect seal section 21 (FIG. 2) to upper pump 23 (FIG. 3), the operator moves seal section 21 and upper pump 23 toward each other in straight axial movement. Fingers 79 will initially be in the undeflected position shown in FIG. 3 and retainer 63 will be in its first or lower position shown in FIG. 2. Fingers 79 enter interior 51 of socket 47 as shown in FIG. 4. The inner diameter d1 (FIG. 3) defined by finger 79 while undeflected is greater than the outer diameter of retainer 63 (FIG. 4). Continued upward movement of fingers 79 causes them to engage ramp surface 53, deflecting them radially inward as shown in FIG. 4. When in the maximum radial inward position as shown in FIG. 4, the inner diameter d2 defined by fingers 79 is less than the outer diameter of retainer 63. The ends of fingers 79 thus contact retainer 63 as shown in FIG. 4. Continued upward movement pushes retainer 63 toward stud 43, causing spring 67 to elongate. Once catches 81 reach axial tension transmitting shoulder 55, the resilience in fingers 79 causes them to spring radially outward as shown in FIG. 5.

When they spring radially outward, the inner diameter defined by finger 79 again returns to the diameter d1, which is greater than the outer diameter of retainer 63. Fingers 79 thus disengage from retainer 63. Coil spring 67 pulls retainer 63 back downward to the first position in substantial alignment with catches 81 and tension transmitting shoulder 55. While in the position shown in FIG. 5, catches 81 cannot move radially inward sufficiently to release from shoulder 55 because they will first contact retainer 63, which blocks further radial inward movement.

Figure 5:
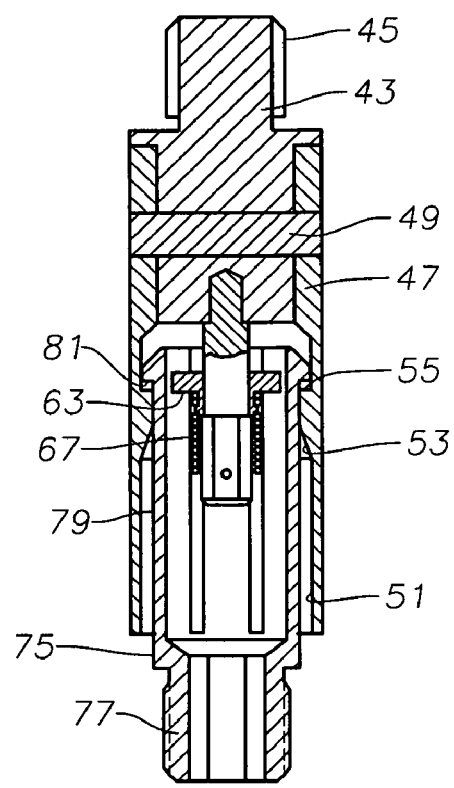
FIG. 5 is a sectional view of the upper and lower portions of the latch member of FIG. 4, shown fully engaged, and not showing the coupling sleeve.

The straight axial movement of the modular component sections toward each other thus causes latch member 75 to automatically snap into engagement with shoulder 55 as well as automatically causes retainer 63 to move to the locked position shown in FIG. 5. The operator may then secure flange 31 (FIG. 2) to base 35 (FIG. 3) with fasteners. There is no access to latch member 75 in this embodiment once it is in the locked position shown in FIG. 5. To later release latch member 75, the operator removes the fasteners that bolt flange 31 to base 35 and pulls the modular sections apart from each other. With sufficient pull, shear pin 49 will shear, which releases socket 47, from stud 43.

The connection between shafts 37 in lower pump section 25 and upper pump section 23 preferably has a latch member 75 constructed as shown in FIGS. 2-5. In the embodiment of FIG. 1, preferably the thrust bearing for pumps 23, 25 is located in seal section 21. A downward force will exist on shafts 37 within pumps 23, 25 during operation due to the weight of shafts 37 and pressure differential. FIG. 6 schematically shows a thrust bearing 83 located in seal section 21. Thrust bearing 83 has a runner 85 that is rigidly secured to the shaft 37 in seal section 21 both for rotation and axial movement. Runner 85 may be fastened to shaft 37 in a variety of manners, such as by split rings, snap rings and keys. Runner 85 rotates slidingly against a stationary base 89 that is mounted in housing 39 of seal section 21. A bushing 91 is shown located between base 89 and shaft 37. Downward force on shaft 37 in lower pump 25 transfers through latch member 75 to shaft 37 in upper pump 23, and through latch member 75 between shaft 37 in upper pump 23 to shaft 37 in seal section 21. The downward force transfers from runner 85 to base 89, which transfers the thrust to housing 39 of seal section 21.

While a similar latch member 75 could be located at the connection of shafts 37 between seal section 21 and motor 17, in this embodiment, motor 17 has its own thrust bearing (not shown) located at its upper end. Consequently, there is no need for a latch member to transmit tension between the upper end of shaft 37 in seal section 21 and the lower end of shaft 37 in motor 17.

FIGS. 7 and 8 show an alternate embodiment for connecting coil spring 67 between retainer 63' and polygonal end 61' of rod 57'. In this embodiment, threads are formed on neck 65' for screwing the upper end of coil spring 67 thereto. A groove 93 is located on the lower end of rod 57'. A lower tang 95 of coil spring 67 slides into engagement with groove 93 as illustrated in FIGS. 7 and 8 to retain the lower end of coil spring 67 on rod 57'.

The invention has significant advantages. The latch member enables tension to be transmitted from the shaft to another within an electrical submersible pump assembly. The latch member is readily connected simply by pushing the modular sections into engagement with each other. The retainer prevents the latch member from becoming disengaged with the load transmitting shoulder. The latch member enables one to employ a thrust bearing above the pump or pumps when mounted below the motor assembly.

While the invention has been shown in only two of its forms, it should be apparent to those skilled in the art that it is not so limited but is susceptible to various changes. For example, the latch member could be inverted with the fingers located in the upper section pointing downward for engaging the axial tension transmitting shoulder. The latch member could be utilized with pumps mounted above the motor if transmitting tension between the shafts is desired.

The invention claimed is:

1. An electrical submersible pump assembly comprising:
   first and second modular component sections, each of the sections having an outer housing and an inner shaft member;
   a coupling sleeve having a bore and disposed between the modular component sections and receiving therein the shaft member of each of the component sections, the bore of the coupling sleeve and exterior portions of the shaft members having mating torque transmitting shoulders;
   an axial tension transmitting shoulder carried by the shaft member of the first modular component section;
   a latch member carried by the shaft member of the second modular section that moves into engagement with the axial tension transmitting shoulder to secure the shaft members to one another for transferring axial tension from one of the shaft members to the other; and
   a retainer carried by one of the shaft members and located adjacent the latch member, the retainer having a locked position that prevents the latch member from disengaging from the axial tension transmitting shoulder once engaged.

2. The assembly of claim 1, wherein the retainer is movable relative to the shaft member on which it is carried to the locked position in response to movement of the latch member into engagement with the axial tension transmitting shoulder.

3. The assembly of claim 1, wherein the retainer is movable relative to the shaft member on which it is carried in response to movement of the latch member into engagement with the axial tension transmitting shoulder, and is biased to the locked position.

4. The assembly of claim 1, wherein the latch member contacts the retainer while being moved into engagement with the axial tension transmitting shoulder and pushes the retainer axially to a position that allows the latch member to engage the axial tension transmitting shoulder, whereupon the retainer moves back to the locked position in response to a spring force.

5. The assembly of claim 1 wherein the latch member comprises:
   a plurality of axially extending fingers with catches that are configured to engage the axial tension transmitting shoulder; the catches of the fingers being resiliently movable in radial directions as they slide into engagement with the axial tension transmitting shoulder; and the retainer comprises:
   an annular member located radially from the catches of the fingers to restrict radial movement of the catches after the catches are in engagement with the axial tension transmitting shoulder.

6. The assembly of claim 1 further comprising a socket mounted to the first shaft member, and wherein:
   the axial tension transmitting shoulder comprises an internal ledge located within the socket;
   the latch member comprises a plurality of axially extending fingers with catches that are configured to engage the axial tension transmitting shoulder; portions of the fingers being resilient to allow the catches to deflect radially outward as they engage the internal ledge while the latch member moves into the socket; and the retainer comprises:
   an annular member carried by the shaft member of the first modular section, the annular member having an outer periphery that locates radially inward from the catches of the fingers to restrict inward radial movement after the catches are in engagement with the axial tension transmitting shoulder.

7. The assembly of claim 6, wherein the annular member is axially movable from a first position to a second position relative to the shaft member of the first modular section in response to contact of ends of the fingers as the modular sections are moved toward each other, and wherein the annular member is biased to the first position.

8. The assembly of claim 1 wherein the outer housings of the component sections are in an abutting relation for the transmittal of axially compressive forces.

9. The assembly according to claim 1, further comprising:
   a shear member that retains the axial tension transmitting shoulder to the shaft member of the first modular section, the shear member shearing upon sufficient tensile overpull to release the shaft members from each other.

10. An electrical submersible pump assembly, comprising:
- first and second modular component sections, each having a central shaft and an outer housing:
- a first shaft end on the shaft of the first modular component section, the first shaft end having at least one drive shoulder thereupon;
- a second shaft end on the shaft of the second modular component section, the second shaft end having at least one drive shoulder thereupon;
- a coupling sleeve having a bore and a drive shoulder within the bore that meshes with the drive shoulders of the first and second shaft ends to transmit torque;
- a socket having an interior with an axial tension transmitting shoulder therein, the socket being affixed to the first shaft end;
- a latch member affixed to the second shaft end, the latch member having fingers with free ends that deflect radially inward as the latch member is moves within the socket, the ends of the fingers moving radially outward as they reach the axial tension transmitting shoulder; and
- a retainer that is carried by the first shaft end radially inward from the ends of the fingers after the catches have engaged the axial tension transmitting shoulder to prevent disengagement of the fingers from the axial tension transmitting shoulder.

11. The assembly according to claim 10, wherein the retainer is axially movable relative to the first shaft end between a first position to a second position and is axially biased toward the first position, the retainer being in the first position and contacted by the ends of the fingers while the ends of the fingers are deflected radially inward, the retainer moving to the second position in response to continued movement of the shaft ends toward each other, the retainer moving back to the first position as the ends of the fingers move radially outward into engagement with the axial tension transmitting shoulder.

12. The assembly according to claim 11, further comprising a spring that biases the retainer to the first position.

13. The connection assembly of claim 11 further comprising a shear member that connects the socket with the first shaft end, and wherein the latch member is selectively released by applying an excessive amount of tension to the shaft ends to shear the shear member.

14. The assembly according to claim 11, further comprising:
- a rod secured to the first shaft end and extending coaxially from the first shaft end;
- wherein the retainer comprises an annular member that slides over the rod and is axially moveable relative to the rod; and wherein the assembly further comprises:
- a coil spring secured to the rod and to the retainer for urging the retainer away from the first shaft end.

15. The assembly according to claim 11, further comprising:
- a converging ramp surface formed in the socket at the axial tension transmitting shoulder that causes the fingers to deflect radially inward as the latch member moves into the socket; and wherein
- the retainer comprises an annular member with an outer diameter greater than an inner diameter defined by the ends of the fingers while deflected radially inward, and less than an inner diameter defined by the ends of the fingers while moved radially outward.

16. An electrical submersible pump assembly comprising:
an electrical motor assembly for suspension within a well;
a pump secured below and driven by the motor assembly;
the motor assembly and the pump having drive shafts with splined ends located adjacent one another;
a coupling sleeve having internal splines that engage the splined ends of the drive shafts of the motor assembly and the pump to transmit rotational forces from the shaft in the motor assembly to the shaft in the pump;
a latch member that connects the splined ends of the shafts for transmitting downward thrust on the shaft in the pump to the shaft in the motor assembly; and
a thrust bearing located in the motor assembly to transfer the downward thrust imposed on the shaft in the motor assembly by the shaft in the pump to a housing of the motor assembly.

17. The assembly according to claim 16 wherein the motor assembly comprises a motor and a seal section secured together, and wherein the thrust bearing is located in the seal section.

18. The assembly according to claim 16, further comprising a retainer cooperatively engaged with the latch member to prevent the latch member from releasing the splined ends of the shafts.

\* \* \* \* \*